July 3, 1951  J. R. YOUNG ET AL  2,558,896
FISHING REEL
Filed March 26, 1947
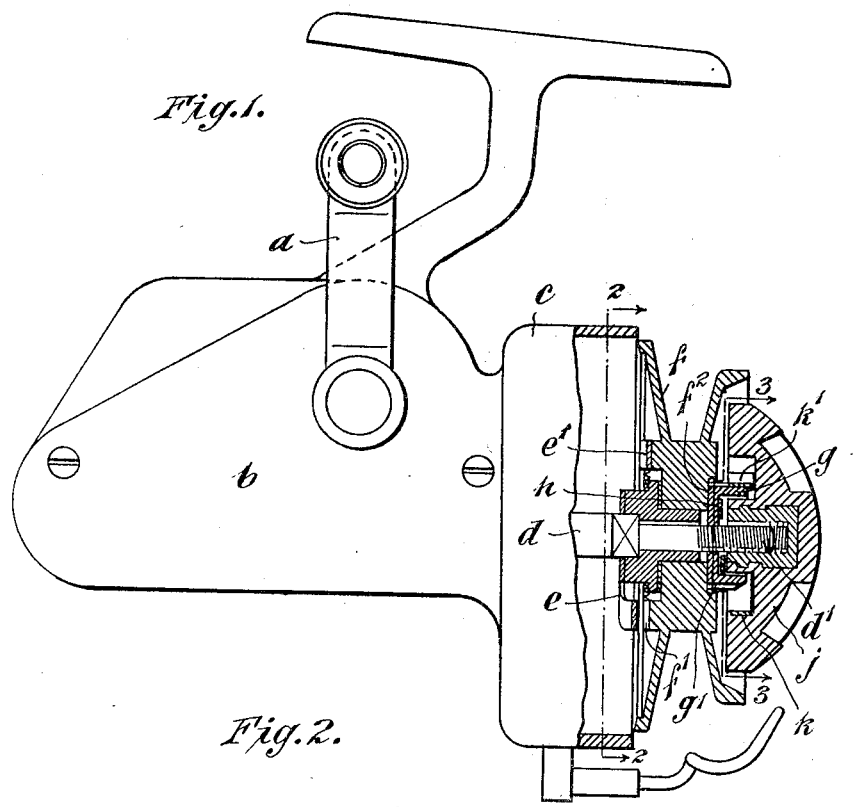
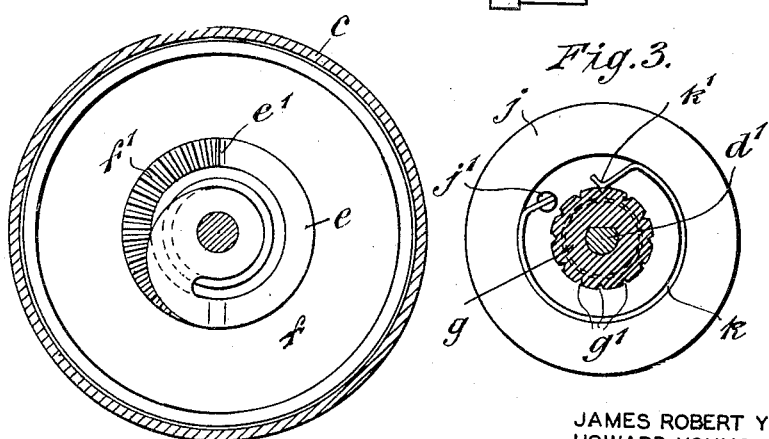
JAMES ROBERT YOUNG
HOWARD YOUNG
EDWARD EMLYN YOUNG
INVENTORS
BY *Marshall and Marshall*
ATTORNEYS Patented July 3, 1951

2,558,896

UNITED STATES PATENT OFFICE 2,558,896

FISHING REEL

James Robert Young, Howard Young, and Edward Emlyn Young, Redditch, England, assignors to J. W. Young & Sons Limited, Redditch, England, a British company Application March 26, 1947, Serial No. 737,306
In Great Britain January 25, 1947

2 Claims. (Cl. 242—84.6)

This invention has reference to improvements in or connected with fishing reels of the kind described and claimed in the specification forming part of U. S. American Patent No. 2,495,621, issued January 24, 1950, which is characterised by the driving spindle for the reel being provided with an optional right or left-hand wind.

The present invention has for its object to incorporate in a fishing reel having the aforesaid characteristic means for audibly indicating to the fisherman that the line is running out and also to incorporate within the tension setting knob forming part of the reel a ratchet mechanism for adjusting the lateral pressure applied to the reel to accord with varying requirements.

The invention consists of a fishing reel of the kind described and claimed in the specification of said U. S. Patent, and is characterised by the incorporation on the inner face of the line drum of a toothed annulus adapted to be maintained in contact with the free end of a spiral spring blade mounted on the worm spindle, said spindle at its one end carrying the tensioning knob which is recessed to contain a blade spring one end of which is maintained in pressure contact with the teeth of a pinion which is adapted to be slidably but non-rotatably mounted on the screw-threaded end of the worm spindle, said pinion in turn being recessed to contain a spring washer.

A preferred embodiment of the present invention will now be described with particular reference to the accompanying sheet of drawings, in which:

Figure 1 is a longitudinal part sectional elevation of a fishing reel mechanism constructed in accordance with the present invention.

Figure 2 is a cross-sectional end elevation on the line 2—2 of Figure 1.

Figure 3 is a cross-sectional end elevation on line 3—3 of Figure 1.

The general arrangement of the fishing reel conforms to that illustrated by the drawings forming part of said U. S. patent, and essentially embodies the characteristic feature whereby the rotatable driving spindle has provision for an optional right or left-hand wind as described in the aforesaid specification and therefore this feature of the mechanism will not need to be repeated. On this driving spindle is mounted the winding handle $a$ the spindle transversely passing through the housing $b$ and is connected through worm wheel and pinion transmission to the rotatable drum casing $c$ within which is co-axially located the longitudinal reciprocally traversable spindle $d$. Anchored to this spindle is one end of a flat spiral resilient blade spring $e$ the free end whereof is bent at $e1$, to form a tooth which tooth is maintained in resilient contact with the toothed annulus $f1$ which forms an integral part of one end face of the line reel $f$. The opposite face of the line reel $f$ to that on which the toothed annulus is formed is provided with a recessed face $f2$ against which face is adapted to abut the inner face of a pinion $g$ which is slidably but non-rotatably mounted on the reciprocating spindle $d$ by having a D-shaped bore formed in the pinion, the flat whereof engages with a flat formed on the screw-threaded end $d1$ of the spindle $d$. This pinion is internally recessed to accommodate a split spring washer $h$ through which variable tension or pressure can be applied to the line reel by the adjustment of the knob $j$ which is screwed on to the threaded end $d1$ of the spindle $d$. This knob is internally recessed to accommodate a blade spring $k$ which is anchored at its one end within a recess $j1$ formed in the knob $j$. The free end of this blade spring is bent to form a tooth $k1$ which is resiliently maintained in contact with the teeth $g1$ of the pinion $g$. It will be appreciated that by tightening the knob $j$ on the screwed end $d1$ of the spindle $d$ that a variation of pressure can be applied through the spring washer $h$ to the pinion $g$ and thus to the line reel $f$, the toothed end $k1$ of the blade spring $k$ serving to maintain the knob at its required setting on the spindle $d$.

In all other respects the mechanism and operation of the fishing reel is similar to that already described in connection with the aforesaid parent patent and further detailed description is unnecessary.

We claim:

1. In a fishing reel having a rotatable open ended casing, a line winding flyer mounted on said casing for rotation therewith, a reciprocating non-rotatable shaft mounted coaxially with said casing and a line reel mounted on said shaft for reciprocation therewith and controlled rotation relative thereto, the improvement in mechanism for signalling the rotation of said reel on said shaft, that consists in a toothed annulus on a radially extending face of said reel and having radially extending teeth; and a spirally shaped, substantially planar, ratchet spring fixed on said shaft with its spiral extending in the direction of rotation of said reel relative thereto and having an axially deformed, detent shaped portion at its end for engagement in said toothed annulus.

2. In a fishing reel having a rotatable open ended casing, a line winding flyer mounted on said casing, a reciprocating, non-rotatable shaft mounted coaxially with said casing and a line reel mounted on said shaft for reciprocation therewith and rotation relative thereto, the improvement that consists in mechanism for regulating and audibly signalling relative rotation between said shaft and said reel, that comprises, in combination, a manually rotatable knob threaded on the end of said shaft and having a radially extending face portion parallel to one radially extending face of said reel, a spring friction element interposed therebetween, a generally planar flat spiral ratchet spring fixed on said shaft in a plane perpendicular thereto, said spring extending spirally from the shaft in the direction of rotation of the reel relative to the shaft and having an axially extending detent-shaped end, and a toothed annulus on the radially extending face of said reel opposed to the first mentioned face, said spring and said reel being axially adjacent and the detent-shaped end of said spring being engaged in said toothed annulus, whereby rotating said knob on said shaft varies the resistance to relative rotation of said knob and said reel and said detent acting in said toothed annulus audibly signals such rotation.

JAMES ROBERT YOUNG.
HOWARD YOUNG.
EDWARD EMLYN YOUNG.

REFERENCES CITED

The following references are of record in the file of this patent:

UNITED STATES PATENTS

| Number | Name | Date |
|---|---|---|
| 2,191,004 | Whitcomb | Feb. 20, 1940 |

FOREIGN PATENTS

| Number | Country | Date |
|---|---|---|
| 373,786 | Great Britain | June 2, 1932 |
| 795,401 | France | Jan. 6, 1936 |